United States Patent [19]

Motzer

[11] 4,037,443

[45] July 26, 1977

[54] KEY RETAINING DEVICE

[75] Inventor: Alfred E. Motzer, Meriden, Conn.

[73] Assignee: The W. E. Bassett Company, Derby, Conn.

[21] Appl. No.: 729,762

[22] Filed: Oct. 5, 1976

[51] Int. Cl.² .............................................. A47G 29/10
[52] U.S. Cl. .......................................... 70/459; 24/239
[58] Field of Search ................ 70/456 R, 456 B, 457, 70/458, 459, 20; 24/3 K, 235, 238–239; 150/40

[56] References Cited

U.S. PATENT DOCUMENTS

| 2,683,979 | 7/1954 | Stageberg | 70/459 |
| 2,896,290 | 7/1959 | Salm | 70/239 |
| 2,923,045 | 2/1960 | Mount | 24/235 |
| 3,621,691 | 11/1971 | Leopoldi | 70/459 |

Primary Examiner—Robert L. Wolfe

Attorney, Agent, or Firm—Hopgood, Calimafde, Kalil, Blaustein & Lieberman

[57] ABSTRACT

The invention contemplates a key retainer with a key-retaining bail extending beyond one end of a case, for selective retention of one or more keys. The combination involves the bail formed as a hook-like part of slide structure within the case. Slide action is limited to motion generally transverse to the direction in which the bail extends beyond the case, and deliberate manual actuation of the slide against a preloading spring is necessary to displace the free end of the hook from (a) a first normally retained position in which the hook is effectively closed by its relation to the case, to (b) a second and temporary position in which the free end of the hook is sufficiently laterally offset from the case to permit selective key insertion on and/or removal from the bail.

8 Claims, 6 Drawing Figures

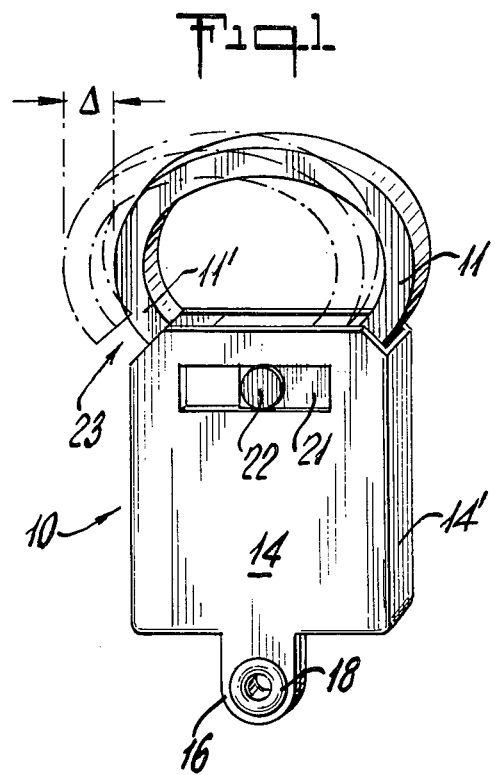
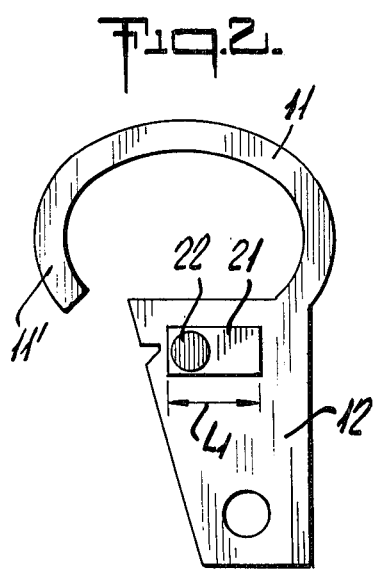
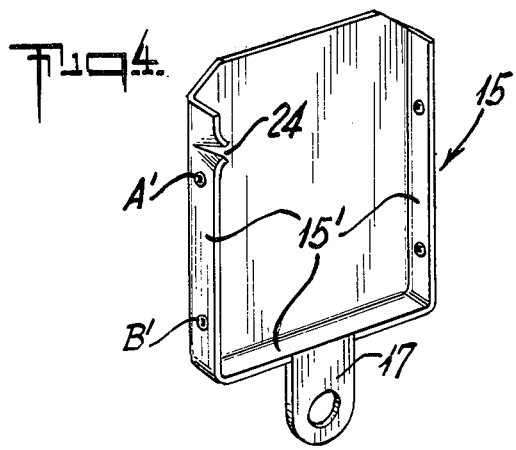
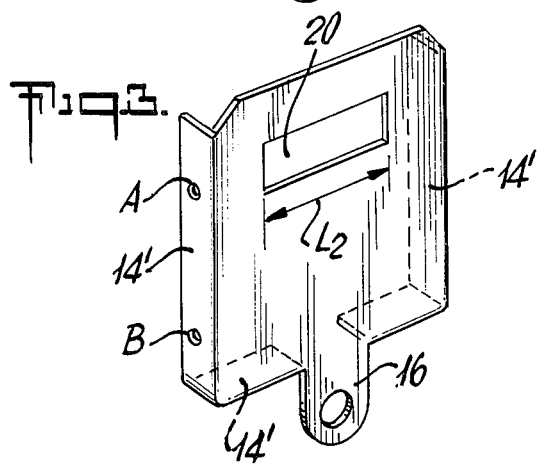
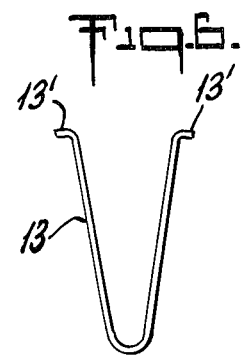
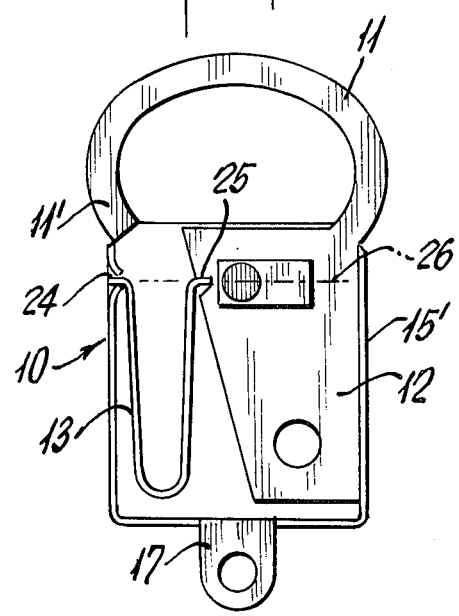

KEY RETAINING DEVICE

The invention relates to a key-retaining device of the variety in which a key-holding bail is assembled to a case.

In prior devices of the character indicated, exemplified by U.S. Pat. No. 3,145,443, a bail forms part of a slide contained within case structure by means of which slide action is confined to the direction in which the bail extends outwardly of the case. The slide is resiliently urged in the direction to effectively close the loop of the bail; but such forces as are involved in removing a key from a lock can be sufficient to displace the bail to its "open" position, thus inviting inadvertent loss of the key(s), identification plate, or other item which may have been assembled to the bail.

It is an object of the invention to provide an improved key-retaining device avoiding the above-noted limitation of past structures.

A specific object is to meet the above object with structure wherein, short of destroying the parts, it is inherently impossible to dislodge a given bail connection to a key, whatever the pulling force, when the case, the bail and the key are pulled substantially on the axis of key-insertion in the lock.

A general object is to achieve the above objects with structure of elemental simplicity, low cost and ease of operation and manufacture.

Other objects and various further features of novelty and invention will be pointed out or will occur to those skilled in the art from a reading of the following specification in conjunction with the accompanying drawings. In said drawings:

FIG. 1 is a view in perspective to show a retainer of the invention;

FIG. 2 is a view in elevation of one side of the slide-bail element of FIG. 1;

FIGS. 3 and 4 are perspective views of the separate halves of the case, for the retainer of FIG. 1;

FIG. 5 is a view in elevation of the assembled parts, the case-half of FIG. 3 having been removed for a better showing of relationships; and FIG. 6 is a view of a spring element, in unstressed condition.

The illustrative retainer shown in the drawings comprises case structure 10, a generally C-shaped or hooked bail 11 formed integrally with a slide body 12, and a spring element 13 normally urging the slide and bail to the "closed" position shown in full lines in FIGS. 1 and 5.

The case 10 happens to be shown as relatively thin and generally rectangularly prismatic, but its shape is not of critical importance. As shown, case 10 comprises front and back panel halves 14 (FIG. 3) and 15 (FIG. 4) with peripheral flanges 14'-15' which nest upon assembly, the front-panel flanges 14' being shown lapped over the rear-panel flanges 15'. Detent or other snap-action relation between coacting formations on all the nested flanges will be understood to retain the case assembly; such formations are illustratively and schematically shown by heavy dots A-B on the near-by flange 14' (of FIG. 3) for registration with ocrresponding formations A'-B' on the near-by flange 15' (of FIG. 4). Registering integral tabs 16-17 depend from each of the case panel halves 14-15 and have registering apertures which may be secured by an eyelet 18, as for accommodation of a bead chain or the like accessory (not shown).

The described case structure 10 will be seen as defining a thin hollow cavity open at one end, in the upward direction shown. It is via one or more such openings at this upper end that the bail 11 can project upwardly from the slide body 12 and from the case 10. Guide formations on the slide body 12 and on at least one of the case panels serve the multiple purpose of retaining the slide, orienting the bail 11 beyond the case, and establishing a generally transverse path for the only possible relative motion of the parts. As shown, the guide formation on the case is a single elongate transverse slot 20 in the front panel 14; the upper and lower marginal edges of slot 20 are parallel, for coaction with transverse parallel base-marginal edges of a rectangular lug or pedestal 21 forming part of the slide body 12. The difference between transverse length $L_1$ of pedestal 21 and transverse length $L_2$ of slot 21 will be understood to determine the permissible extent of slide displacement, suggested in FIG. 1 by the transverse offset $\Delta$ observable for the bail 11, as between its "closed" position (solid outlines) and its "open" position (phantom outlines). A further outwardly projecting integral knob 22 on pedestal 21 may be provided for convenience of manual operating access to the slide body, as will be understood.

It will be noted that the displaceable extent $\Delta$ is such as to enable the free end 11' of bail 11 to effectively close any gap between end 11' and case 10 in the "closed" position, and to open a key-insertion gap 23 for the left-displaced position of slide 12. Preferably, in the "closed" position, the free end 11' of bail 11 is at least in partial sandwiched overlap between adjacent edges of panels 14-15, so that the case 10 may further stabilize a "closed" retainer against key loss.

Spring 13 is shown simply as a V-shaped ribbon stressed to preload slide body 12 at all times in the direction of the "closed" position. Preferably, spring 13 is so constructed and located as to assure a resultant spring-force vector which is substantially aligned with the described slide-guide formations. For spring 13, this is achieved by providing like outwardly divergent flanged ends 13' on the ends of the V-shape, as shown for the unstressed situation depicted in FIG. 6. Upon assembly, one of these ends 13' is received in a local notch or slot 24 in an inner case flange 15' (see FIGS. 4 and 5), and the other end 13' is received in a notch formation 25 in the adjacent edge of slide body 12. As is clear from FIG. 5, the spring-force application points 24-25 are aligned with the axis 26 of slide guidance.

It will be seen that I have described improved retainer structure meeting all stated objects. The case and slide parts may be of plastic or metal, but metal is preferred. In metal, the device is accurately and ruggedly manufactured using well-known tooling techniques. The slide body 12 and bail 11 may be of extremely rugged and hardened nature, with guide and actuating formations die-formed by locally offsetting displacement prior to hardening. And in particular, no amount of pull when the case 10 and bail 11 are substantially aligned with a key-insertion axis can jeopardize the "closed" condition of the retainer.

While the invention has been described in detail for the form shown, it will be understood that modifications may be made without departure from the scope of the invention.

What is claimed is:

1. In a key retainer or the like, a case defined by and between spaced edge-connected front and back panel members, with an opening at one end, a slide member having a body movably carried by said case between said panel members, said slide member integrally including a key-receiving generally C-shaped bail including a first end integral with said slide, said first bail end extending in a first direction away from said body and through said opening and beyond said one end of said case, guide means coacting between said slide member and at least one of said panel members and determining a range of slide movement transverse to said first direction and within said case, the other end of said bail being otherwise spaced from said body such that (a) in one limiting position of slide guidance the said other end of said bail coacts with the adjacent region of said case to define an effectively closed key-retaining bail loop and (b) in a second position of slide guidance said other end of said bail is spaced from said case to an extent permitting selective key application to or removal from said bail, and spring means coacting between said slide and case and resiliently urging said slide in the direction of said one position, whereby any force tending to pull an assembled key in said first direction away from said case is totally sustained by said guide means, normally and substantially without risk of slide displacement from said one position.

2. The ratainer of claim 1, in which said guide means is rectilineal in nature, and is substantially orthogonally related to the direction in which the bail ends extend away from said case.

3. The retainer of claim 1, in which said guide means comprises an elongate slot in one of said panel members and a guide lug integral with said body and guided by said slot.

4. The retainer of claim 3, in which said lug projects externally of the slotted panel member and is accessible for manual actuation.

5. The retainer of claim 3, in which said lug includes opposed parallel elongate base margins in slidable guided relation with the respective opposed elongate margins of the slot.

6. The retainer of claim 1, in which said spring means is retained at a force-developing alignment that is substantially the alignment of said guide means.

7. The retainer of claim 5, in which said spring means comprises a stiffly compliant generally V-shaped member with free ends directed in opposite outward directions on substantially the same alignment, and aligned and spaced notch means on said case and slide body in spring-retaining locating relation with the respective free ends of said compliant member.

8. The retainer of claim 1, in which in said one limiting position the said other end of said bail is positioned between corresponding opposed edge portions of both said panel members.

* * * * *